(12) United States Patent
Nicholson et al.

(10) Patent No.: US 12,457,301 B2
(45) Date of Patent: Oct. 28, 2025

(54) VIDEO PROCESSING ADJUSTMENT BASED ON USER LOOKING/NOT LOOKING

(71) Applicant: LENOVO (SINGAPORE) PTE. LTD., Singapore (SG)

(72) Inventors: John W. Nicholson, Morrisville, NC (US); Daryl C. Cromer, Morrisville, NC (US); Howard Locker, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 18/436,501

(22) Filed: Feb. 8, 2024

(65) Prior Publication Data

US 2025/0260785 A1 Aug. 14, 2025

(51) Int. Cl.
*H04N 7/01* (2006.01)
*G06F 3/01* (2006.01)

(52) U.S. Cl.
CPC ........... *H04N 7/0117* (2013.01); *G06F 3/013* (2013.01); *H04N 7/013* (2013.01)

(58) Field of Classification Search
CPC ....... H04N 7/0117; H04N 7/013; G06F 3/013
See application file for complete search history.

(56) References Cited

U.S. PATENT DOCUMENTS

| | | | | |
|---|---|---|---|---|
| 5,511,000 A * | 4/1996 | Kaloi | ................... | G11C 7/16 704/278 |
| 5,641,288 A * | 6/1997 | Zaenglein, Jr. | ....... | F41G 3/2633 434/21 |
| 5,966,167 A * | 10/1999 | Nose | ..................... | H04N 13/398 348/54 |
| 6,078,349 A * | 6/2000 | Molloy | ................ | H04N 21/658 375/E7.182 |
| 6,195,640 B1 * | 2/2001 | Mullaly | .................. | G06F 3/013 704/260 |
| 6,307,526 B1 * | 10/2001 | Mann | ..................... | H04N 23/55 348/207.1 |
| 6,717,607 B1 * | 4/2004 | Lauper | ................... | H04N 7/147 348/E7.083 |
| 6,959,450 B1 * | 10/2005 | Ritter | ............... | H04N 21/44213 382/103 |
| 6,985,158 B2 * | 1/2006 | Miller | ..................... | H04N 1/00 345/428 |
| 7,460,150 B1 * | 12/2008 | Coughlan | ................ | H04N 7/15 348/333.03 |

(Continued)

*Primary Examiner* — Michael B. Pierorazio
(74) *Attorney, Agent, or Firm* — John M. Rogitz; John L. Rogitz

(57) ABSTRACT

In one aspect, a first device includes a processor assembly, a display, and storage. The storage includes instructions executable by the processor assembly to receive video from a second device different from the first device, determine whether a user is looking at the display, and process the video a first way for presentation on the display based on a determination that the user is not looking at the display. The instructions are also executable to process the video a second way for presentation on the display based on a determination that the user is looking at the display. The first way may include using a lower resolution or slower frame rate than the second way. The first way may also include using a CPU little core rather than a GPU.

20 Claims, 5 Drawing Sheets

(56) References Cited

U.S. PATENT DOCUMENTS

| | | | | |
|---|---|---|---|---|
| 7,736,000 B2* | 6/2010 | Enriquez | A61B 3/113 | 351/205 |
| 8,196,064 B2* | 6/2012 | Krzyzanowski | H04N 21/43615 | 715/814 |
| 8,266,536 B2* | 9/2012 | Roberts | G06F 3/011 | 715/706 |
| 8,395,656 B1* | 3/2013 | Malzbender | H04N 21/4318 | 348/14.08 |
| 8,416,715 B2* | 4/2013 | Rosenfeld | H04M 3/567 | 379/202.01 |
| 8,421,782 B2* | 4/2013 | Sakata | G06F 3/1454 | 725/12 |
| 8,566,838 B2* | 10/2013 | Sabin | H04L 41/0803 | 709/222 |
| 8,638,223 B2* | 1/2014 | Lahcanski | G06F 3/013 | 340/572.1 |
| 8,736,660 B2* | 5/2014 | Rosenberg | H04N 13/383 | 348/14.02 |
| 8,879,801 B2* | 11/2014 | Ragland | G06V 40/168 | 382/128 |
| 8,933,886 B2* | 1/2015 | Imoto | G06F 3/0346 | 345/158 |
| 9,073,433 B2* | 7/2015 | Seymour | B60K 35/29 | |
| 9,219,840 B2* | 12/2015 | Ashbrook | G06V 20/20 | |
| 9,323,325 B2* | 4/2016 | Perez | G06F 3/012 | |
| 9,329,682 B2* | 5/2016 | Keane | G02B 27/017 | |
| 9,485,459 B2* | 11/2016 | Shoemake | H04N 7/141 | |
| 11,682,368 B1 | 6/2023 | Lopez Mendez et al. | | |
| 12,210,676 B1* | 1/2025 | Nizampatnam | G06F 3/015 | |
| 2002/0085843 A1* | 7/2002 | Mann | E03C 1/057 | 396/374 |
| 2002/0141614 A1* | 10/2002 | Lin | H04N 19/17 | 375/E7.182 |
| 2003/0052911 A1* | 3/2003 | Cohen-solal | H04L 65/612 | 715/738 |
| 2004/0061787 A1* | 4/2004 | Liu | H04N 5/2628 | 348/E5.042 |
| 2004/0235466 A1* | 11/2004 | Kakemura | H04N 1/0035 | 455/418 |
| 2005/0086069 A1* | 4/2005 | Watson | H04N 21/4755 | 726/3 |
| 2005/0108092 A1* | 5/2005 | Campbell | A61B 3/113 | 705/14.69 |
| 2006/0028400 A1* | 2/2006 | Lapstun | G02B 27/0093 | 345/8 |
| 2006/0187306 A1* | 8/2006 | Matsui | H04N 23/61 | 348/208.14 |
| 2006/0256133 A1* | 11/2006 | Rosenberg | G06F 3/013 | 345/619 |
| 2007/0050253 A1* | 3/2007 | Biggs | G06Q 30/0271 | 705/14.67 |
| 2007/0165964 A1* | 7/2007 | Wolf | G06F 3/048 | 382/276 |
| 2007/0178891 A1* | 8/2007 | Louch | H04M 11/007 | 455/420 |
| 2007/0271518 A1* | 11/2007 | Tischer | H04N 21/4532 | 715/744 |
| 2007/0271580 A1* | 11/2007 | Tischer | H04H 60/07 | 725/35 |
| 2008/0022569 A1* | 1/2008 | Winn | G09F 25/00 | 40/457 |
| 2008/0111833 A1* | 5/2008 | Thorn | G06F 1/3231 | 345/690 |
| 2008/0147488 A1* | 6/2008 | Tunick | G06Q 30/04 | 382/209 |
| 2008/0240698 A1* | 10/2008 | Bartilson | H04N 23/69 | 348/E5.042 |
| 2009/0015658 A1* | 1/2009 | Enstad | H04N 7/15 | 348/240.99 |
| 2009/0034750 A1* | 2/2009 | Ayoub | G10L 25/69 | 704/E15.001 |
| 2009/0133051 A1* | 5/2009 | Hildreth | H04N 21/42204 | 725/28 |
| 2009/0262206 A1* | 10/2009 | Park | H04N 23/66 | 348/584 |
| 2010/0053555 A1* | 3/2010 | Enriquez | G06V 40/19 | 351/210 |
| 2010/0066804 A1* | 3/2010 | Shoemake | H04N 21/4143 | 348/14.02 |
| 2010/0080418 A1* | 4/2010 | Ito | G06V 40/20 | 382/103 |
| 2010/0218170 A1* | 8/2010 | MacLellan | G06F 11/3428 | 717/127 |
| 2010/0306379 A1* | 12/2010 | Ferris | G06F 9/5072 | 718/104 |
| 2010/0315482 A1* | 12/2010 | Rosenfeld | H04L 65/403 | 348/E7.083 |
| 2011/0034242 A1* | 2/2011 | Aronzon | A63F 13/77 | 463/44 |
| 2011/0063457 A1* | 3/2011 | Tokumitsu | H04N 23/661 | 348/207.11 |
| 2011/0153362 A1* | 6/2011 | Valin | G06Q 20/1085 | 340/5.82 |
| 2011/0161163 A1* | 6/2011 | Carlson | G06F 3/015 | 348/78 |
| 2011/0164044 A1* | 7/2011 | Huang | A63B 24/0087 | 345/473 |
| 2011/0185237 A1* | 7/2011 | Mahdi | H04L 51/214 | 714/49 |
| 2011/0193971 A1* | 8/2011 | Lin | H04N 7/18 | 348/207.1 |
| 2011/0213664 A1* | 9/2011 | Osterhout | G06F 3/013 | 705/14.58 |
| 2011/0255010 A1* | 10/2011 | Sakai | H04N 21/426 | 348/730 |
| 2011/0267499 A1* | 11/2011 | Wan | H04N 23/6811 | 348/240.2 |
| 2011/0292181 A1* | 12/2011 | Acharya | G06F 21/32 | 348/47 |
| 2011/0317587 A1* | 12/2011 | Lida | H04L 49/557 | 370/254 |
| 2012/0075168 A1* | 3/2012 | Osterhout | G06F 3/017 | 345/8 |
| 2012/0086785 A1* | 4/2012 | Valin | G06Q 20/40 | 348/47 |
| 2012/0120266 A1* | 5/2012 | Kang | H04N 23/635 | 348/E5.042 |
| 2012/0123786 A1* | 5/2012 | Valin | G06Q 30/02 | 705/26.1 |
| 2012/0134238 A1* | 5/2012 | Surprenant | H04S 1/007 | 367/137 |
| 2012/0154599 A1* | 6/2012 | Huang | G08B 13/19608 | 348/169 |
| 2012/0194418 A1* | 8/2012 | Osterhout | G02B 27/0149 | 345/156 |
| 2012/0194419 A1* | 8/2012 | Osterhout | G02B 27/017 | 345/156 |
| 2012/0194420 A1* | 8/2012 | Osterhout | G06F 3/013 | 345/156 |
| 2012/0194549 A1* | 8/2012 | Osterhout | G06Q 30/02 | 345/633 |
| 2012/0194550 A1* | 8/2012 | Osterhout | G06F 1/163 | 345/633 |
| 2012/0194551 A1* | 8/2012 | Osterhout | G06F 3/005 | 345/633 |
| 2012/0194552 A1* | 8/2012 | Osterhout | G06F 1/163 | 345/633 |
| 2012/0194553 A1* | 8/2012 | Osterhout | G06F 3/017 | 345/633 |
| 2012/0200488 A1* | 8/2012 | Osterhout | G02B 27/0093 | 345/156 |
| 2012/0200499 A1* | 8/2012 | Osterhout | G06F 1/163 | 345/158 |
| 2012/0200601 A1* | 8/2012 | Osterhout | G02B 27/017 | 345/633 |
| 2012/0206322 A1* | 8/2012 | Osterhout | G06F 3/005 | 345/8 |

(56) References Cited

U.S. PATENT DOCUMENTS

| | | | |
|---|---|---|---|
| 2012/0206323 A1* | 8/2012 | Osterhout | G06Q 30/02 345/8 |
| 2012/0206334 A1* | 8/2012 | Osterhout | G06F 1/163 345/156 |
| 2012/0206335 A1* | 8/2012 | Osterhout | G06F 1/163 345/156 |
| 2012/0206485 A1* | 8/2012 | Osterhout | G06F 1/163 345/633 |
| 2012/0212414 A1* | 8/2012 | Osterhout | G06F 1/163 345/158 |
| 2012/0212484 A1* | 8/2012 | Haddick | G06Q 30/02 345/419 |
| 2012/0212499 A1* | 8/2012 | Haddick | G02B 27/0093 345/589 |
| 2012/0236107 A1* | 9/2012 | Rosenberg | H04N 13/383 348/14.08 |
| 2012/0266252 A1* | 10/2012 | Spiers | H04L 9/3247 726/26 |
| 2012/0300061 A1* | 11/2012 | Osman | G06F 1/3231 340/436 |
| 2012/0320147 A1* | 12/2012 | Kirby | H04N 23/69 348/E7.083 |
| 2012/0331113 A1* | 12/2012 | Jain | H04L 67/1008 709/220 |
| 2013/0050432 A1* | 2/2013 | Perez | G06F 3/011 348/47 |
| 2013/0067508 A1* | 3/2013 | Janssen | G06F 21/31 725/30 |
| 2013/0141518 A1* | 6/2013 | Chou | H04N 7/148 348/14.08 |
| 2013/0265382 A1* | 10/2013 | Guleryuz | G06T 11/60 348/14.08 |
| 2013/0344961 A1* | 12/2013 | Iannetta | A63F 13/213 463/36 |
| 2014/0041513 A1* | 2/2014 | Abesser | G10H 1/0008 84/622 |
| 2014/0043227 A1* | 2/2014 | Skogo | G06F 1/325 345/156 |
| 2014/0049593 A1* | 2/2014 | Pai | H04M 3/51 348/14.01 |
| 2014/0133658 A1* | 5/2014 | Mentz | H04S 7/304 381/1 |
| 2014/0168056 A1* | 6/2014 | Swaminathan | G06V 30/142 345/156 |
| 2014/0185828 A1* | 7/2014 | Helbling | H04R 1/1041 381/103 |
| 2014/0195428 A1* | 7/2014 | Ghetler | G06Q 20/40 705/44 |
| 2014/0208340 A1* | 7/2014 | Poornachandran | H04N 21/4751 725/10 |
| 2014/0247321 A1* | 9/2014 | Rosenberg | G02B 30/00 348/14.08 |
| 2014/0282744 A1* | 9/2014 | Hardy | H04N 21/482 725/61 |
| 2014/0362170 A1* | 12/2014 | Walker | H04N 19/147 348/14.08 |
| 2015/0085056 A1* | 3/2015 | Van Broeck | G06F 3/013 348/14.1 |
| 2015/0138303 A1* | 5/2015 | White | H04N 7/144 348/14.07 |
| 2015/0169053 A1 | 6/2015 | Bozarth et al. | |
| 2015/0178939 A1* | 6/2015 | Bradski | H04N 13/00 345/633 |
| 2015/0237439 A1* | 8/2015 | Koss | H04H 20/95 381/74 |
| 2016/0081104 A1* | 3/2016 | Wu | H04W 72/12 370/336 |
| 2016/0260196 A1* | 9/2016 | Roimela | G02B 27/0172 |
| 2017/0011492 A1* | 1/2017 | Thunström | G06F 3/013 |
| 2017/0046815 A1 | 2/2017 | Wang et al. | |
| 2017/0287112 A1* | 10/2017 | Stafford | G06F 3/013 |
| 2018/0018943 A1* | 1/2018 | Clarke | G09G 5/14 |
| 2020/0103967 A1* | 4/2020 | Bar-Zeev | G06F 3/147 |
| 2020/0132996 A1* | 4/2020 | Yokota | G06F 3/013 |
| 2020/0183488 A1* | 6/2020 | Hong | A61B 5/11 |
| 2022/0019449 A1 | 1/2022 | Song et al. | |
| 2024/0212291 A1* | 6/2024 | Keetle-Maloney | G06F 3/012 |
| 2024/0353923 A1* | 10/2024 | Nistico | G06F 3/013 |
| 2024/0377884 A1* | 11/2024 | Bridon | G06T 15/04 |

* cited by examiner

VIDEO PROCESSING ADJUSTMENT BASED ON USER LOOKING/NOT LOOKING

FIELD

The disclosure below relates to technically inventive, non-routine solutions that are necessarily rooted in computer technology and that produce concrete technical improvements. In particular, the disclosure below relates to techniques for dynamic video decoding based on whether the user is looking at the video or not.

BACKGROUND

As recognized herein, video decoding is typically done by a computing device's graphics processing unit (GPU). However, this often causes significant battery drain and/or undue power consumption from a wall outlet. In fact, high-quality video streaming applications often require a dedicated GPU for decoding, as that might be the only processing unit capable of maintaining an optimal frame rate and resolution for the video stream. But this accelerates battery drain/power consumption even further.

Additionally, video decoding on the GPU over long periods of time can result in undue heat buildup within the device, adversely affecting the overall life of other hardware components that absorb the heat that gets generated. Heat buildup can also adversely affect system performance on a short-term basis as well, sometimes even causing the other components to become inoperable until the heat dissipates.

There are currently no adequate solutions to the foregoing computer-related, technological problems.

SUMMARY

Accordingly, in one aspect a first device includes a processor assembly, a display accessible to the processor assembly, and storage accessible to the processor assembly. The storage includes instructions executable by the processor assembly to receive video from a second device different from the first device, determine whether a user is looking at the display, and process the video a first way for presentation on the display based on a determination that the user is not looking at the display. The instructions are also executable to process the video a second way for presentation on the display based on a determination that the user is looking at the display, where the second way is different from the first way.

In some example implementations, the first way may include processing the video for presentation on the display at a first resolution, and the second way may include processing the video for presentation on the display at a second resolution. Here, the second resolution may be higher than the first resolution.

Additionally or alternatively, the first way may include processing the video for presentation on the display at a first frame rate, and the second way may include processing the video for presentation on the display at a second frame rate. The second frame rate may be faster than the first frame rate.

As another example, the first way may include processing the video for presentation on the display using a central processing unit (CPU), and the second way may include processing the video for presentation on the display using a graphics processing unit (GPU). The GPU may be different from the CPU. Additionally, in various specific example implementations the first way may include processing the video for presentation on the display using a larger core of two cores on the CPU, while in other example implementations the first way may include processing the video for presentation on the display using a smaller core of at least two cores on the CPU.

As another specific example, the first way may include each of processing the video for presentation on the display at the first resolution, processing the video for presentation on the display at the first frame rate, and processing the video for presentation on the display using the CPU. In this case, the second way may include each of processing the video for presentation on the display at the second resolution, processing the video for presentation on the display at the second frame rate, and processing the video for presentation on the display using the GPU.

Still further, in some cases the instructions may be executable to receive input from a camera. The instructions may then be executable to execute eye tracking using the input from the camera to determine whether the user is looking at the display. The first device might even include the camera in some instances.

In addition to or in lieu of that, the instructions may also be executable to receive input from a human presence detection (HPD) sensor and then determine whether the user is looking at the display using the input from the HPD sensor. Here the first device might even include the HPD sensor itself.

Furthermore, in various example implementations, the instructions may also be executable to maintain a buffer of a threshold amount of past video frames while processing the video the first way. In one specific example, the instructions may even be executable to maintain a buffer of a threshold amount of past video frames in multiple resolutions for each respective past video frame while processing the video the first way.

In another aspect, a method includes receiving, at a first device, video from a second device different from the first device. The method also includes determining whether a user is looking at a display on which the video is to be presented. Based on determining that the user is not looking at the display, the method includes processing the video a first way at the first device for presentation on the display. Additionally, based on determining that the user is looking at the display, the method includes processing the video a second way at the first device for presentation on the display. The second way is different from the first way.

In a specific example implementation, the first way may include declining to process first non-I-frames of the video for presentation on the display, and the second way may include processing the first non-I-frames of the video for presentation on the display. The first non-I-frames may include P-frames of the video and/or B-frames of the video.

In still another aspect, at least one computer readable storage medium (CRSM) that is not a transitory signal includes instructions executable by a processor assembly to receive, at a first device, video from a second device different from the first device. The instructions are also executable to determine whether a user is looking at a display and, based on a determination that the user is not looking at the display, process the video a first way for presentation on the display. Based on a determination that the user is looking at the display, the instructions are executable to process the video a second way for presentation on the display. The second way is different from the first way.

Thus, in one example the first way may include declining to process first (e.g., any/all) non-I-frames of the video for presentation on the display, and the second way may include processing the first non-I-frames of the video for presentation on the display.

Additionally or alternatively, the first way may include processing the video for presentation on the display using a central processing unit (CPU), and the second way may include processing the video for presentation on the display using a graphics processing unit (GPU). The GPU may be different from the CPU.

The details of present principles, both as to their structure and operation, can best be understood in reference to the accompanying drawings, in which like reference numerals refer to like parts, and in which:

DETAILED DESCRIPTION

Figure 1:
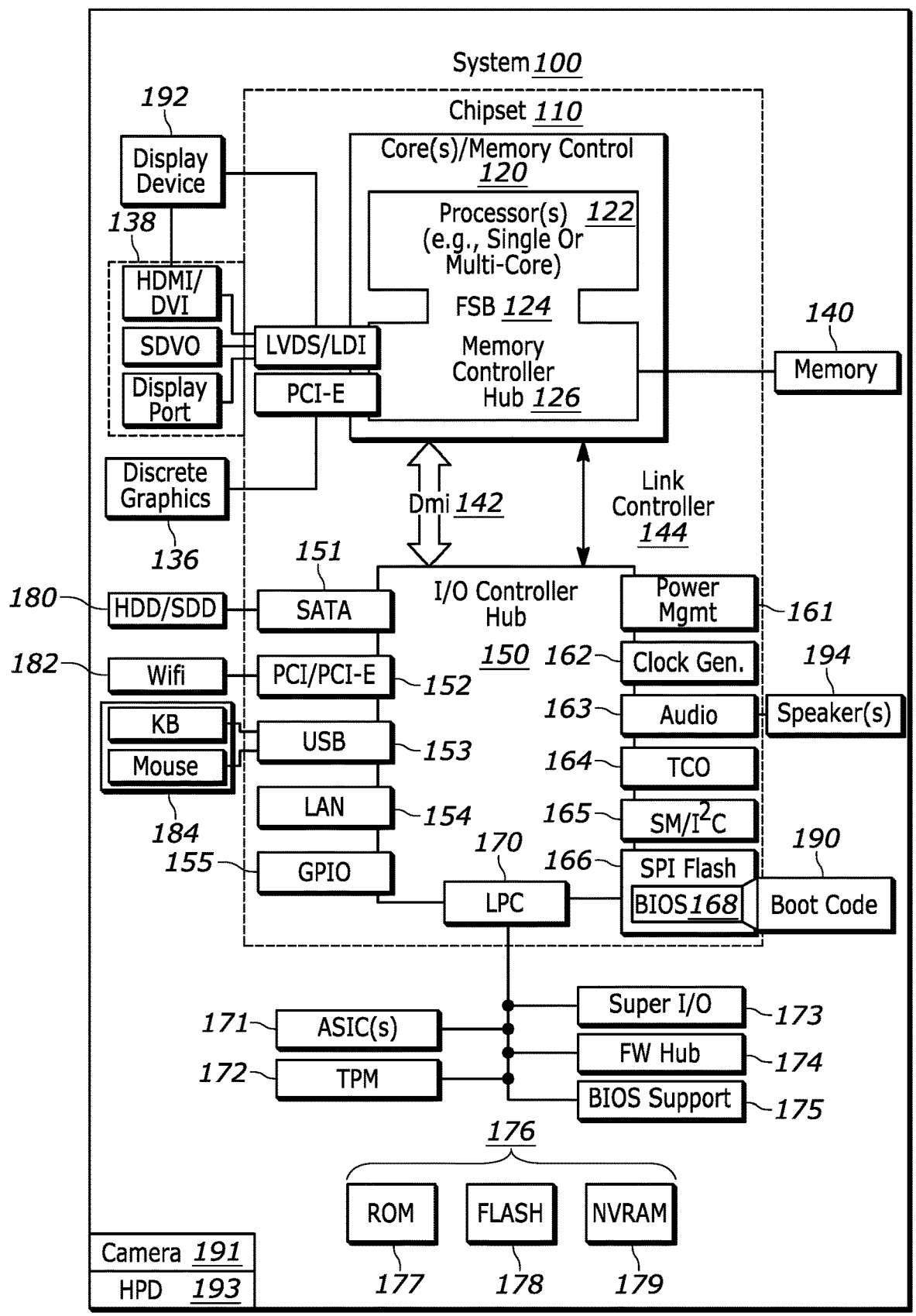
FIG. 1 is a block diagram of an example system consistent with present principles.

To save power, reduce heat buildup, and improve the functioning and life cycle of a computing device, present principles recognize that if a target user is not looking at a video streaming window during video playout, the device need not present the video in the highest quality resolution and fastest frame rate available since the user would not be watching the video anyway. But when the user looks back at the video stream again, the video stream may seamlessly switch back to the higher quality resolution and faster frame rate. Furthermore, processors that consume less power overall (such as a CPU big core or, for even greater power savings, a CPU little core) may also be used for video decoding when the user is not looking. Note that a given processor chip may include multiple big cores and multiple little cores.

Thus, incoming video streams such as online prerecorded videos and live video conferencing streams may be decoded/processed using a combination of CPU and GPU processing consistent with present principles. Indeed, many ARM (advanced RISC machines) processors and x86 processors have both big and little cores. Big cores may be performance-focused and can handle heavier tasks, while little cores are even more efficiency-oriented and can run background tasks while consuming considerably less energy than the CPU's larger core. Thus, present principles discuss, among other things, dynamically switching between which processor component handles video decoding to save system power and reduce heat generation where possible (e.g., while also reducing power consumption due to system fans not being needed or needed as much to cool system components, which in turn may also help reduce the amount of noise produced by the fans).

Specifically, systems and methods are disclosed below for detecting when a user is not looking at the video streaming window so that the device can adjust playback to conserve the device's battery or overall power consumption (e.g., from an AC wall outlet). There are several adjustments to playback that the device may make, which may be used alone or in combination.

For example, for streaming video, there are often multiple resolutions that are available for receipt. This is done for network bandwidth purposes, but a device operating consistent with present principles can make use of this availability to reduce power consumption by processing a lower resolution/higher compression video stream when the user is looking away.

Additionally, a device operating consistent with present principles might only decode/process the periodic I-frames of the video and skip over or not process the P-frames and B-frames of the video while the user is not looking. Implementation of this option may vary per video based on the framerate of the I-frames for the respective video. For example, if an I-frame is decoded only every 5 seconds, this might be too slow and result in what essentially would be a series of still images being presented on the display rather than a video. So in that case, P-frames and/or B-frames might also be decoded. As another example, if the intraframe (I-frame) rate is 2 frames per second (fps), a device operating consistent with present principles may skip every other intraframe or every Nth intraframe to further reduce power consumption.

What's more, as alluded to above, the processing/decoding of the periodic frames may be moved from the GPU to another processor, such as to the energy efficient little core of the CPU. Whether this is done and which CPU core might be assigned to handle the decoding may be determined on a video-by-video basis based on the resolution and framerate of whatever video is being received as well as the capabilities of the respective CPU core itself. So if the downgraded video decoding is still a relatively high-load task but some power savings is desired, the CPU's larger core may be used, whereas for relatively lighter tasks and even greater power savings the CPU's smaller core may be used instead. In one specific but non-limiting example implementation, the device might begin by always moving decoding to the CPU little core to save the most power, then work backwards to figure out resolution, frame rate, etc. that the little core can handle and possibly move decoding to the CPU big core if appropriate. So, e.g., the device might want to do 640×480 at one frame per second and therefore determine if the little core can handle that processing. If it can, the little core may be used, but if not then decoding may be moved to the CPU big core. Thus, this may be a function of how long it takes the little core to decode an I frame, and whether the little core was doing anything else that might adversely affect decoding capability.

Or as another specific non-limiting example, the device may calculate what is needed in a given instance for decoding with the big and little CPU cores and then determine whether the little core could do the decoding based on the calculation and, if not, use the big core.

Then when the user returns or looks back at the screen, the device may switch video decoding back to the GPU for normal/optimal framerate and resolution processing and presentation. Given this, in some instances the video may be processed faster-than-real time from the last intraframe through all the prediction frames (P-frames and B-frames) to get to the current frame and resume normal playback (e.g., resume playback from a P-frame or B-frame in particular). As such, a buffer of past frames may be maintained, possibly at multiple video resolutions.

For example, while the user looks at the screen, the video may be GPU hardware-assisted decoded at 60 fps and ultra high definition (HD) resolution (3840×2160 resolution). When the user looks away, the video may be decoded on the CPU little core (e.g., using a software codec) at one fps and VGA resolution (640×480 resolution).

In terms of gaze detection, the device can detect if the user is not looking at the video streaming window by using human presence detection methods, including eye tracking using cameras as well as other methods. Note that the delay time/latency in gaze tracking may be short enough that the user's experience can be changed according to the foregoing frame rate and resolution adjustments in an almost imperceptible manner. Likewise, moving a decoding task between cores and/or codecs and/or GPUs can be done imperceptibly fast as well.

As for decoding itself, it is to be understood consistent with present principles that video decoding may include converting a compressed digital video file (encoded video) into a decompressed, playable format that can be presented by a device. During decoding, the compressed video data may therefore be decompressed and transformed back into its original format (and hence larger overall size), allowing the video to be presented in a playable form. As such, a video codec may be used to decode and decompress the received video data.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in the art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C # or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor assembly 122 (e.g., one or more single core or multi-core processors, etc.) and a memory controller hub 126 that exchange information via a front side bus (FSB) 124. A processor assembly such as the assembly 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may also include one or more cameras 191 that gather one or more images and provide the images and related input to the processor assembly 122 (e.g., for eye tracking consistent with present principles). The camera may be a thermal imaging camera, an infrared (IR) camera, a digital camera such as a webcam, a three-dimensional (3D) camera, and/or a camera otherwise integrated into the system 100 and controllable by the processor assembly 122 to gather still images and/or video of a user's eyes during video consumption.

The system 100 may further include one or more human presence detection (HPD sensors) 193, such as but not limited to a microphone (for detecting a user speaking and hence user presence), an infrared (IR) sensor (for detecting heat and/or motion and hence user presence), keyboards and track pads and mice and touch-enabled displays (for detecting user input and hence user presence via input device use), and Bluetooth transceivers and other wireless transceivers (for detecting wireless signals from another device associated with the user and hence user presence).

Additionally, though not shown for simplicity, in some embodiments the system 100 may include a gyroscope that senses and/or measures the orientation of the system 100 and provides related input to the processor assembly 122, an accelerometer that senses acceleration and/or movement of the system 100 and provides related input to the processor assembly 122, and/or a magnetometer that senses and/or measures directional movement of the system 100 and provides related input to the processor assembly 122. Still further, the system 100 may include an audio receiver/microphone that provides input from the microphone to the processor assembly 122 based on audio that is detected, such as via a user providing audible input to the microphone.

Also, the system 100 may include a global positioning system (GPS) transceiver that is configured to communicate with satellites to receive/identify geographic position information and provide the geographic position information to the processor assembly 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
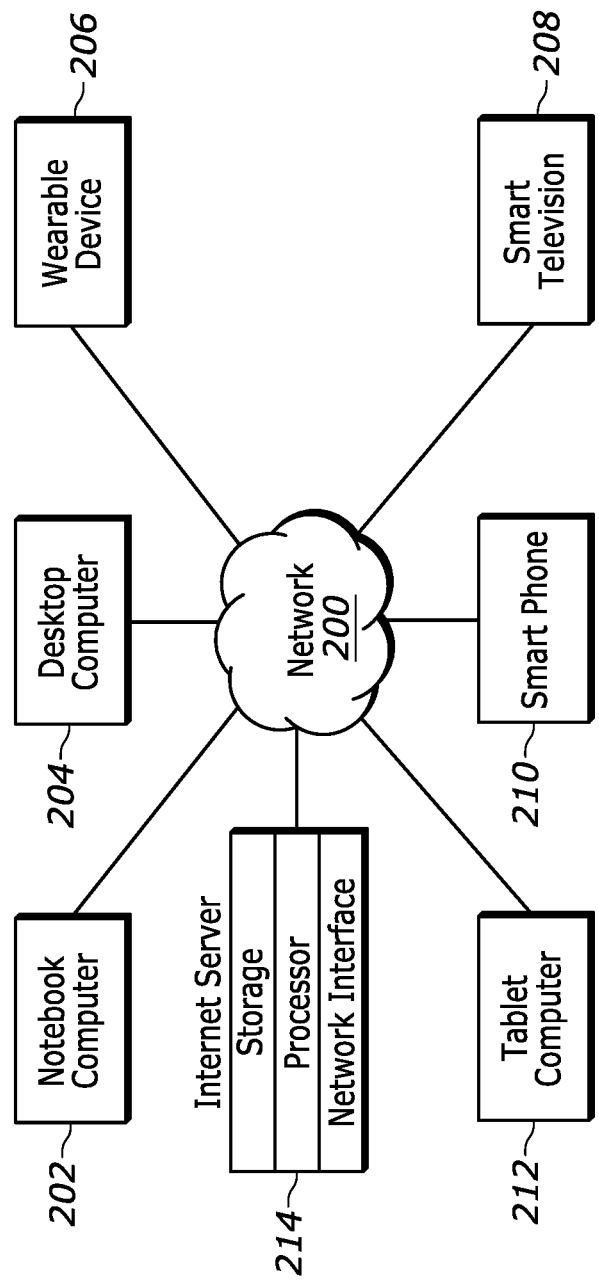
FIG. 2 is a block diagram of an example network of devices consistent with present principles.

Turning now to FIG. 2, example devices are shown communicating over a network 200 such as the Internet consistent with present principles (e.g., for video streaming from one device to another). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
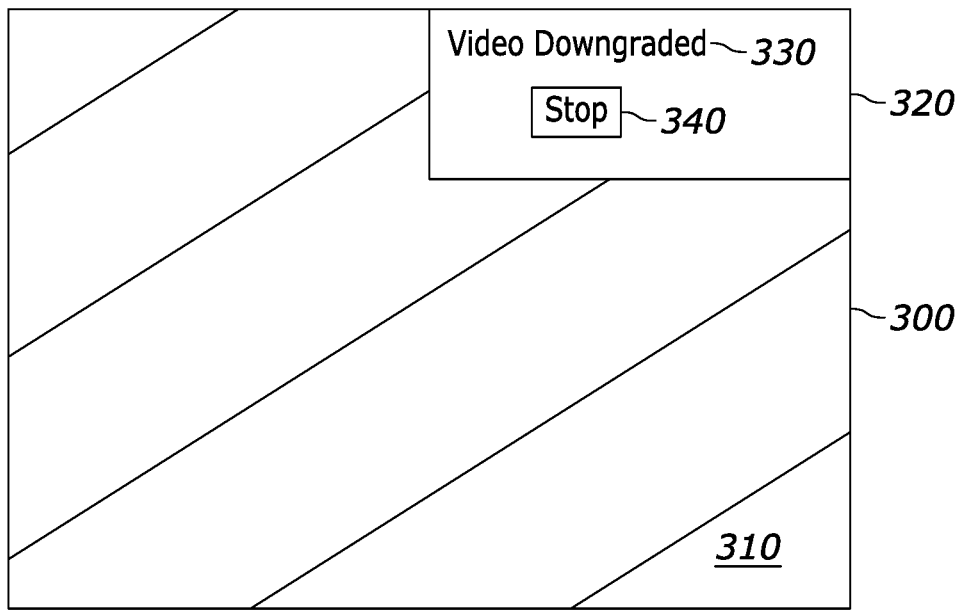
FIG. 3 shows an example notification that may be presented while video has been downgraded as a user looks offscreen consistent with present principles.

Referring now to FIG. 3, suppose an end-user is streaming video to his or her device, such as a smartphone, laptop computer, wearable device, computerized smart glasses, or even an augmented reality (AR) or virtual reality (VR) headset. The video might be from a video-sharing website or social media platform, for example. The video might also be streamed as part of a live video conference in which the end-user is participating, and as such the video may be real time video showing the faces of other conference participants. Other types of video may also be received and processed consistent with present principles.

In any case, FIG. 3 shows that a graphical user interface (GUI) 300 may be presented on the device's display. The GUI 300 itself may present the received and decoded video (designated as video 310 in FIG. 3) in real time as it is received and processed. However, note that in the present instance the video presentation has been downgraded to a lower resolution and slower frame rate owing to the device determining that the user is not looking at the at the device's display generally or even a particular display area that is actually presenting the video (e.g., where the video is presented in a non-maximized or non-full screen window). Additionally or alternatively, the device may offload video decoding from the GPU to a larger or smaller core of a CPU when the user is not looking, also resulting in a downgraded video presentation but one that consumes less power to present.

In addition to performing the foregoing actions in response to determining that the user is not looking at the display/video window, the device may present a graphical notification 320 over top of the video 310. The notification 320 may include a text indication 330 that the video has been downgraded. The notification 320 may also include a selector 340 that is selectable to command the device to stop downgrading the video presentation and to present the video 310 at an optimal/maximum available resolution and frame rate using the device's GPU. Therefore, the user might choose to select the selector 340 if the device's eye tracking results in a false positive where the user is not actually looking away but the device has determined as much. Or the user might choose to select the selector 340 in other situations as well, such as where more than one person is viewing the video 320 on the device's display and the device might only be tracking the gaze of one of the two users that happens to be looking offscreen (while the other user continues to view the video and hence would not wish it to be downgraded).

Figure 4:
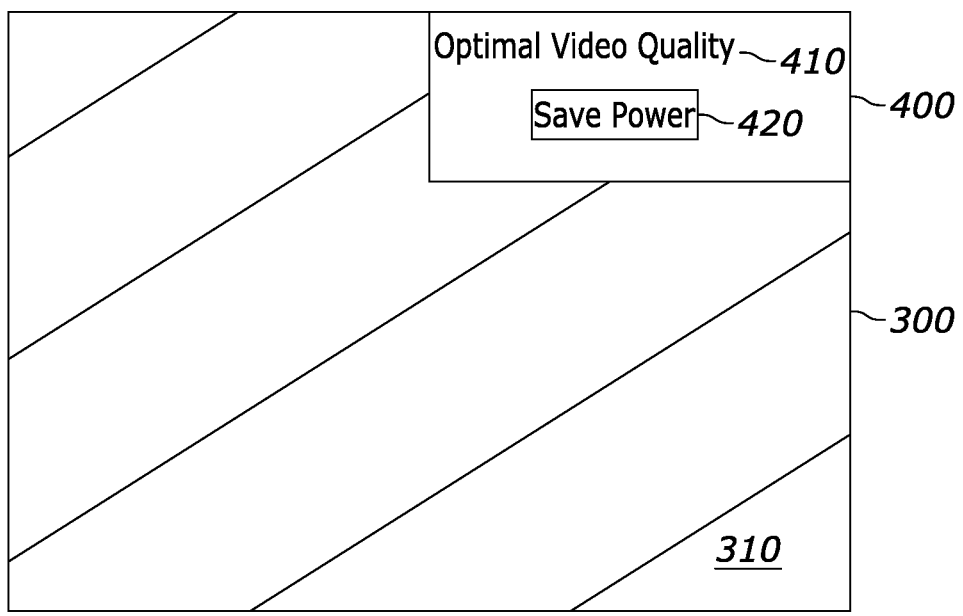
FIG. 4 shows an example notification that may be presented while the video is played out at optimal/maximum quality based on the user looking at the video consistent with present principles.

Turning to FIG. 4, the GUI 300 is again presented on the display, which again includes presenting the video 310 itself as part of the GUI 300. However, the notification 320 may be replaced by the notification 400 as shown at the top of the GUI 300 in FIG. 4. The notification 400 may be presented in response to determining that the user is looking back at the device's display again. Accordingly, the notification 400 may include a text indication 410 that the video has been upgraded and/or is being presented at an optimal or best-available video quality again. The notification 400 may also include a selector 420 that is selectable to command the device to downgrade the video presentation consistent with present principles (e.g., process the video 310 using a slower frame rate and lower resolution on a CPU core rather than the GPU) even though the user might still be determined to be looking at the display/video window. The user might choose to select the selector 420 if, for example, the user is not paying particularly close attention to the video 310 and wishes to save power, if the user keeps glancing back and forth between the display and something else and hence does not desire optimal video quality, or if the user simply wants to reduce power consumption and heat generation during video playout regardless.

Figure 5:
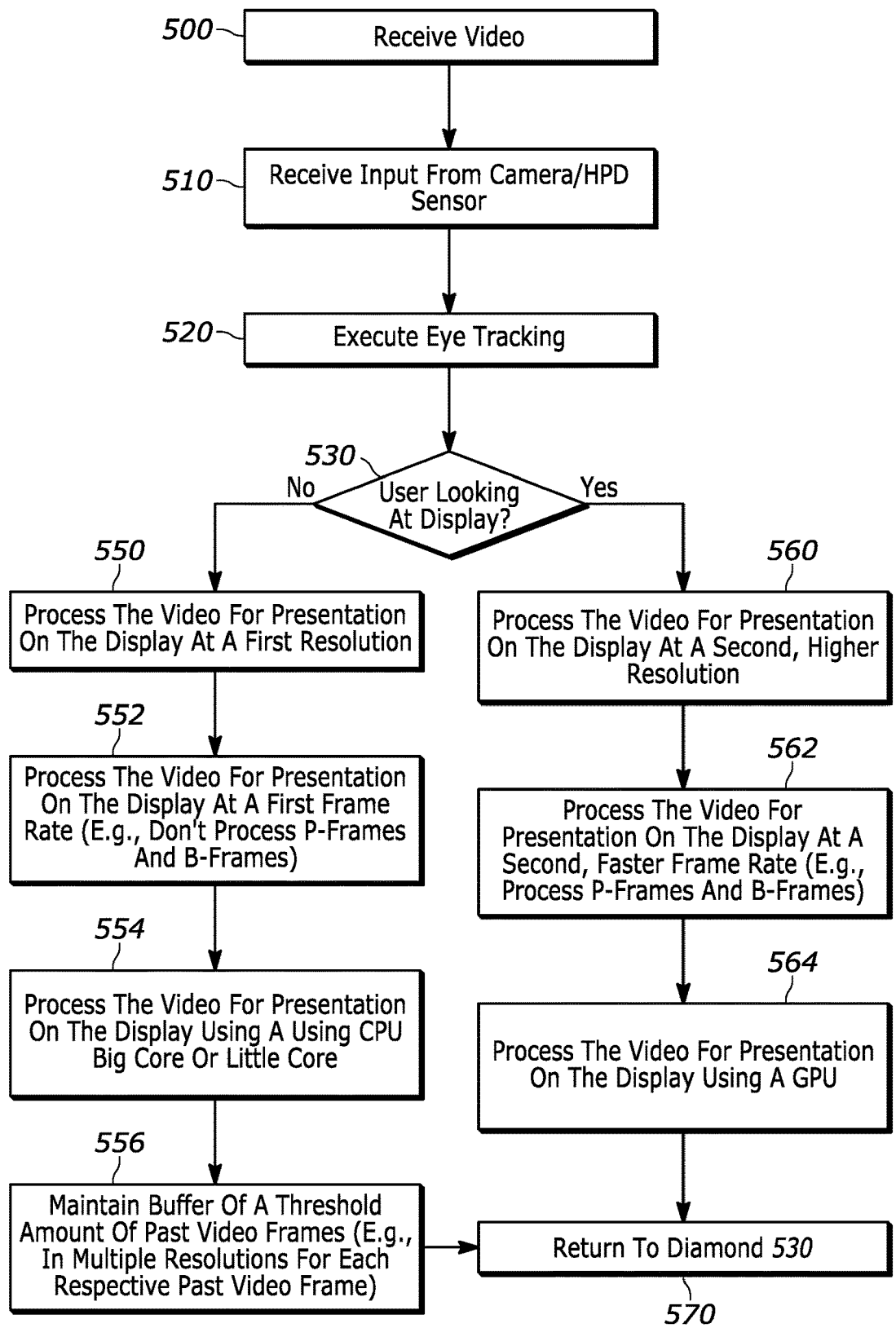
FIG. 5 illustrates example logic in example flow chart format that may be executed by a device consistent with present principles.

With the foregoing in mind, reference is now made to FIG. 5. This figure shows example logic that may be executed by a first device such as the system 100, processor assembly 122, and/or client device of FIGS. 3 and 4 consistent with present principles. Note that while the logic of FIG. 5 is shown in flow chart format, other suitable logic may also be used. Also note that the first device may be a client device such as a smartphone, laptop computer, wearable device, headset, etc.

Beginning at block 500, the first device may receive video from a second device different from the first device. The second device might be, for example, an Internet-based server or cloud platform hosting prerecorded videos uploaded by other end-users, such as a YouTube server. Or the second device may be a server of a video streaming service such as Netflix or Amazon Prime. The second device might also be a video conferencing server that routes audio video streams between participating client devices, or even another one of the conferencing client devices themselves. The second device might also be another client device outside the video conferencing context, such as another client device from which prerecorded video or a live, real time video stream is being received. Other implementations for the second device are encompassed by present principles as well.

From block 500 the logic may then proceed to block 510. At block 510 the first device may receive input from one or more sensors such as a camera (e.g., the camera 191) or other HPD sensor (including other HPD sensors 193 mentioned above). The logic may then proceed to block 520 where, if camera input is received, an eye tracking algorithm may be executed using the camera input to determine whether the user is looking at the first device's display (at decision diamond 530).

Additionally or alternatively, at block 520 the first device may process other types of HPD sensor input that might be received at block 510 to determine (at diamond 530) whether the user is looking at the first device's display. For example, if the HPD sensor is a microphone, audible input to the microphone may be processed to identify a person as speaking, in which case the person may be assumed to be looking at the display. Or the microphone input may be processed using natural language understanding (NLU) to determine that the person that is speaking is speaking specifically about content associated with the video itself (e.g., as identified from video metadata or NLU being executed on the video's associated audio content), in which case the person may be assumed to be looking at the display. Additionally or alternatively, voice identification may be executed using the microphone input to identify a user that is speaking as being a particular user associated with the first device, in which case the person may be assumed to be looking at the display since the person is already a registered/recognized user.

As another example, input from an IR sensor may be used to detect heat and/or motion via the IR sensor input, in which case a user that is the source of the heat or motion may be assumed to be looking at the display. As yet another example, input received at connected input devices such as a keyboard, a touch-enabled laptop track pad, a mouse, and/or a touch-enabled display may be used to detect user presence owing to someone instigating the input in the first place, in which case the person may be assumed to be looking at the display.

As but one more non-limiting example, other HPD techniques also being encompassed by present principles, input from a Bluetooth transceiver and other wireless transceiver (e.g., ultrawideband transceiver, Wi-Fi transceiver, and/or near-field communication transceiver) may also be used to determine that another client device is present owing to wireless signals being received from it, in which case a nearby person may be assumed to be looking at the display owing to the presence of the other client device. In some specific examples, the wireless signals received from the other client device may include identifying information for the other client device itself, which may then be correlated to a particular user that is registered with the first device or that is otherwise recognizable as a past user of the first device (and hence the first device may assume that the recognized/registered user is looking at the display). Additionally or alternatively, a unique user identifier (UUID) from which the user might be similarly identified may be provided via the wireless signals and then used to assume the user is looking at the display based on the presence of the UUID in the signals.

Still further, in some examples a received signal strength indicator (RSSI) algorithm may be executed using the received wireless signals to not just identify a given user that might be registered or otherwise associated with the first device as being present somewhere around the first device, but to determine that the other client device itself is within a threshold non-zero distance of the first device. The threshold distance may be less than the maximum range that the respective wireless signals are capable of being transmitted, and may be an amount sufficient to infer not just user presence in a general area around the first device but actual user proximity to the first device to assume the user is close enough to potentially be looking at the first device's display. As such, the threshold distance may be ten feet or less when the first device is a laptop computer, smartphone, wearable device, or headset. If the first device is a television instead, the threshold distance might be more based on the recognition that people generally sit farther from a television than they might a laptop or smartphone display, and as such the threshold distance for a television implementation may be twenty feet.

Still in reference to FIG. 3, any of the eye tracking/HPD techniques mentioned above may therefore be used to determine whether the user is in fact looking at the display or not. Responsive to the first device determining that the user is not looking at the display, one or more of blocks 550-556 may then be executed to process the video a first way for presentation on the display. However, responsive to the first device determining that the user is actually looking at the display, one or more of blocks 560-564 may instead be executed to process the video a second way for presentation on the display.

Beginning with blocks 550 and 560, the first device may process the video for presentation on the display at a first resolution at block 550, whereas at block 560 the first device may instead process the video for presentation on the display at a second resolution that is higher than the first resolution. For example, while the user looks at the display, the video may be decoded at ultra-high definition (UHD) resolution (3840×2160 resolution) at block 560, whereas while the user looks away from the display (or is not present at all) the video may be decoded at VGA resolution (640×480 resolution) at block 550. Accordingly, for example, in streaming video there are often multiple resolutions that are available for streaming/receipt. The first device may therefore make use of this availability to reduce power consumption by requesting and then processing a lower resolution/higher compression video stream that is available while the user is looking away from the display, and then switching to requesting and processing a higher resolution/lower compression video stream that is available while the user is looking back at the display again.

Turning to blocks 552 and 562, the first device may process the video for presentation on the display at a first frame rate at block 552, whereas at block 562 the first device may process the video for presentation on the display at a second frame rate that is faster than the first frame rate. For example, while the user looks at the display, the video may be decoded at 60 fps, whereas while the user looks away from the display the video may be decoded at one fps at block 562.

Still in terms of frame rate and providing another example, at block 552 the device may decline to process first non-I-frames of the video for presentation on the display (e.g., decline to process P-frames and B-frames) since the user is not looking at the display at that point. However, at block 562 based on the user being determined as looking at the display, the first device may instead process the first non-I-frames of the video for presentation on the display. The first non-I-frames may include all available/received non-I-frames.

Note that I-frames are the least compressible frames of the three, but generally do not require other video frames to decode them (e.g., they are fully-renderable on the display on their own accord without data from prior or later frames being used to render a complete image). In contrast, P-frames may use data from previous frames for decompression and rendering of the P-frames (and are more compressible than I-frames). B-frames may use both previous and later frames for data reference to get a higher amount of data compression for subsequent decompression and rendering by the first device.

As for blocks 554 and 564, the first device may process the video for presentation on the display using a CPU larger or smaller core, whereas at block 564 the first device may process the video for presentation on the display using a relatively higher-performance GPU instead. For example, while the user looks at the display, the video may be decoded using the GPU, whereas while the user looks away from the display the video may be decoded using the CPU's larger "big" core to reduce power consumption and heat generation while still maintaining a relatively high level of performance. Or for even greater power savings and heat reduction, the CPU's smaller "little" core may be used instead of the GPU. Either way, the CPU might still use a software codec for decoding, for example.

Note that from block 564 the logic may proceed directly to block 570, as will be described shortly. However, in terms of block 554, note that the logic may proceed therefrom to block 556 before ultimately proceeding to block 570.

At block 556 and still based on determining that the user is not looking at the display, the first device may maintain a buffer of a threshold amount of past video frames while processing the video the first way(s). The buffer may be maintained in random access memory (RAM) of the first device or at another storage location, such as a persistent solid-state drive (SDD) or hard disk drive (HDD) storage location. In any case, the buffering of past images may be performed to process the images faster-than-real time from a last/most-recent past I-frame and through all the ensuing prediction frames (P-frames and B-frames) that might also be past frames to get to the current frame's rendering and then resume normal playback even without any intervening additional I-frames being received and/or processed (e.g., resume playback from a current P-frame or B-frame). Thus, the threshold amount of past video frames that are maintained in the buffer may include all P-frames and B-frames subsequent to a most recently-received I-frame (the most recently-received I-frame also being maintained in the buffer until a next I-frame in the I-frame sequence is received). Thus, a reference (most-recent) I-frame and intervening P-frames and B-frames may accumulate in the buffer and then removed/deleted from the buffer responsive to another I-frame being received (since the past P-frames and B-frames in reference to the past I-frame would no longer be needed for image rendering owing to a subsequent I-frame has been received).

Additionally, in one particular example implementation, the first device may maintain the buffer of the threshold amount of past video frames not just in one resolution but in multiple resolutions for each respective past video frame at block 556. This may be done so that a highest-available resolution for the frames may be dynamically selected and used on the fly notwithstanding any potential network bandwidth issues or other constraints, with each respective I-frame, B-frame, and/or P-frame as buffered at multiple resolutions already being cached in local storage for real time playout without delay.

Now describing the aforementioned block 570, note that it may be arrived at via block 556 or block 564. At block 570 the first device may return to decision diamond 530 to again determine whether the user is looking at the display during playout of a later portion of the same video. Thus, the process of FIG. 5 may continually repeat during video playout to adjust playback back and forth between different resolutions, frame rates, and decoding processors, enabling the first device to be more energy-efficient on the fly where possible.

Thus, in one specific example implementation consistent with the logic of FIG. 5, when the first device detects that the user is not looking at the display, the first device can move the video decoding from the high power GPU to the lower power CPU little core. Recognizing that the CPU little core might not have as much performance as the GPU might, in this case the first device may reduce resolution, reduce frame rate, and skip B-frames, P frames, and even I frames to conform to the performance factor of the CPU little core when moving the video decoding thereto.

Also note with respect to the logic of FIG. 5 that should the user override the current handling of video decoding by the GPU, or CPU big or little core, according to user input such as described above with respect to FIGS. 3 and 4, then the user's command would override the logic above and the device would operate in accordance with the user's command.

What's more, note that in instances where decoding is offloaded to the CPU big or little core, the GPU may be turned off or otherwise deenergized during CPU decoding to save additional power. Then when the user is determined to look back at the display again, the GPU may be powered back on and used for video decoding.

Figure 6:
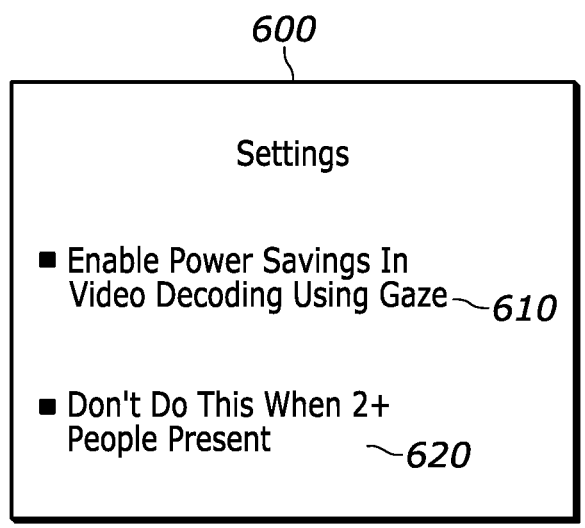
FIG. 6 shows an example settings GUI that may be presented on a display to configure one or more settings of a device to operate consistent with present principles.

Turning now to FIG. 6, another example GUI 600 is shown that may be presented on the display of a client device configured to undertake present principles. The GUI 600 may be presented to set or enable one or more settings of the first device (e.g., its guest operating system) or a particular video streaming app stored at the first device (that might itself execute the logic of FIG. 5). As such, the GUI 600 may be navigated to through a device or app menu, for example. Also note that each of the example options discussed below may be selected by directing touch or cursor input to the associated check box adjacent to the respective option.

As shown in FIG. 6, the GUI 600 may include an option 610 that may be selected to set or configure the device/app to undertake present principles. Thus, option 610 may be selected a single time to set or enable the device/app to, in multiple future instances of video streaming (e.g., for different discrete videos/video files), execute the logic of FIG. 5 and present the notifications of FIGS. 3 and 4. Thus, option 610 may be selected to enable dynamic video decoding/processing using user gaze to save power and reduce heat generation that might otherwise reduce the overall life of different components within the first device.

The GUI 600 may also include an option 620. The option 620 may be selected to set or enable the device to specifically not execute dynamic video processing based on user gaze when two or more people are determined to be at least present if not looking directly at the first device's display. This might be done using camera input as well as computer vision and/or facial recognition to thus identify the number of people shown in the camera input. As another example, microphone input may be processed to identify two different voices as being detected to therefore infer that two or more people are present. IR sensors and other types of HPD sensors may also be used for determining as much. Thus, options 610 and 620 might both be concurrently selected in one specific example so that video presentation may be dynamically downgraded when a single user that is present is determined to be looking away from the display, but also so that video presentation is not downgraded when more than one user is present so that optimal video quality is utilized even if one of the users happens to look away and the device detects as much.

Moving on from FIG. 6, as alluded to above, in some examples a device operating consistent with present principles may not just determine whether a user is generally looking at a display or not. Instead, the device may specifically determine whether the user is looking at a particular display area or window at which the video content itself is presented, where that area or window may be less than an entire area of the display on which images are presentable. Thus, if the user was viewing the video in a relatively small window on the display while also working on a word processing document, responding to emails, or viewing other content that is concurrently presented on the display, the device may present the video according to the first way(s) of FIG. 5 while the user is determined to be looking at the other content and then present the video according to the second way(s) of FIG. 5 when the user switches back to looking at the video itself.

As another example, if the user had another window maximized in the foreground as the active window, and had the video's window minimized or at least in the background as a non-active window (e.g., even if still partially or fully presented on some portion of the display), the device may present the video according to the first way(s) of FIG. 5 while the other window is the active window in the foreground and then present the video according to the second way(s) of FIG. 5 when the user switches back to the video window being the active window in the foreground.

It may now be appreciated that present principles provide for an improved computer-based user interface that increases the functionality and overall life of the devices disclosed herein while also making the devices more energy-efficient. The disclosed concepts are rooted in computer technology for computers to carry out their functions.

Components included in one embodiment can be used in other embodiments in any appropriate combination. For example, any of the various components described herein and/or depicted in the Figures may be combined, interchanged or excluded from other embodiments.

It is to be understood that whilst present principals have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. A first device, comprising:
a processor assembly;
a display accessible to the processor assembly; and
storage accessible to the processor assembly and comprising instructions executable by the processor assembly to:
receive video from a second device different from the first device;
determine whether a user is looking at the display;
based on a determination that the user is not looking at the display, process the video a first way for presentation on the display; and
based on a determination that the user is looking at the display, process the video a second way for presentation on the display, the second way being different from the first way;
wherein the first way comprises processing the video for presentation on the display using a central processing unit (CPU), and wherein the second way comprises processing the video for presentation on the display using a graphics processing unit (GPU), the GPU being different from the CPU.

2. The first device of claim 1, wherein the first way comprises processing the video for presentation on the display at a first resolution, and wherein the second way comprises processing the video for presentation on the display at a second resolution, the second resolution being higher than the first resolution.

3. The first device of claim 1, wherein the first way comprises processing the video for presentation on the display at a first frame rate, and wherein the second way comprises processing the video for presentation on the display at a second frame rate, the second frame rate being faster than the first frame rate.

4. The first device of claim 1, wherein the first way comprises processing the video for presentation on the display using a larger core of two cores on the CPU.

5. The first device of claim 1, wherein the first way comprises processing the video for presentation on the display using a smaller core of at least two cores on the CPU.

6. The first device of claim 1, wherein:
the first way comprises each of:
processing the video for presentation on the display at a first resolution, processing the video for presentation on the display at a first frame rate, and processing the video for presentation on the display using the CPU; and
the second way comprises each of:

processing the video for presentation on the display at a second resolution, processing the video for presentation on the display at a second frame rate, and processing the video for presentation on the display using the GPU;

wherein the second resolution is higher than the first resolution, the second frame rate is faster than the first frame rate, and the GPU is different from the CPU.

7. The first device of claim 1, wherein the instructions are executable to:
receive input from a camera; and
execute eye tracking using the input from the camera to determine whether the user is looking at the display.

8. The first device of claim 7, comprising the camera.

9. The first device of claim 1, wherein the instructions are executable to:
receive input from a human presence detection (HPD) sensor; and
determine whether the user is looking at the display using the input from the HPD sensor.

10. The first device of claim 9, comprising the HPD sensor.

11. The first device of claim 1, wherein the instructions are executable to:
while processing the video the first way, maintain a buffer of a threshold amount of past video frames.

12. The first device of claim 1, wherein the instructions are executable to:
while processing the video the first way, maintain a buffer of a threshold amount of past video frames in multiple resolutions for each respective past video frame.

13. A method, comprising:
receiving, at a first device, video from a second device different from the first device;
determining whether a user is looking at a display on which the video is to be presented;
based on determining that the user is not looking at the display, processing the video a first way at the first device for presentation on the display; and
based on determining that the user is looking at the display, processing the video a second way at the first device for presentation on the display, the second way being different from the first way;
wherein the first way comprises declining to process first non-I-frames of the video for presentation on the display, and wherein the second way comprises processing the first non-I-frames of the video for presentation on the display.

14. The method of claim 13, wherein the first non-I-frames comprise P-frames of the video.

15. The method of claim 13, wherein the first non-I-frames comprise B-frames of the video.

16. An apparatus, comprising:
at least one computer readable storage medium (CRSM) that is not a transitory signal, the at least one CRSM comprising instructions executable by a processor assembly to:
receive, at a first device, video from a second device different from the first device;
determine whether a user is looking at a display;
based on a determination that the user is not looking at the display, process the video a first way for presentation on the display;
while processing the video the first way, maintain a buffer of a threshold amount of past video frames; and
based on a determination that the user is looking at the display, process the video a second way for presentation on the display, the second way being different from the first way.

17. The apparatus of claim 16, wherein the first way comprises declining to process first non-I-frames of the video for presentation on the display, and wherein the second way comprises processing the first non-I-frames of the video for presentation on the display.

18. The apparatus of claim 16, wherein the first way comprises processing the video for presentation on the display using a central processing unit (CPU), and wherein the second way comprises processing the video for presentation on the display using a graphics processing unit (GPU), the GPU being different from the CPU.

19. The apparatus of claim 16, wherein the instructions are executable to:
while processing the video the first way, maintain the buffer of the threshold amount of past video frames in multiple resolutions for each respective past video frame.

20. The apparatus of claim 16, comprising the processor assembly.

* * * * *